(12) United States Patent
Kim

(10) Patent No.: US 8,081,981 B2
(45) Date of Patent: *Dec. 20, 2011

(54) METHOD AND APPARATUS FOR OPTIMIZING NEIGHBOR LIST FOR HANDOVER MANAGEMENT

(75) Inventor: Shin-Jae Kim, Goyang-si (KR)

(73) Assignee: KT Corporation, Seoul (KR)

( * ) Notice: Subject to any disclaimer, the term of this patent is extended or adjusted under 35 U.S.C. 154(b) by 442 days.

This patent is subject to a terminal disclaimer.

(21) Appl. No.: 12/255,501

(22) Filed: Oct. 21, 2008

(65) Prior Publication Data

US 2009/0047961 A1    Feb. 19, 2009

Related U.S. Application Data

(63) Continuation of application No. PCT/KR2007/004996, filed on Oct. 12, 2007.

(30) Foreign Application Priority Data

Nov. 2, 2006   (KR) .................. 10-2006-0108017

(51) Int. Cl.
*H04Q 7/20* (2006.01)
(52) U.S. Cl. ......... 455/439; 455/436; 370/331; 370/468
(58) Field of Classification Search .................. 455/436, 455/439; 370/331, 468
See application file for complete search history.

(56) References Cited

U.S. PATENT DOCUMENTS

| | | | |
|---|---|---|---|
| 6,034,971 A * | 3/2000 | Love et al. ................ | 370/468 |
| 7,826,847 B1 * | 11/2010 | Roskowski et al. ........... | 455/436 |
| 2005/0048974 A1 | 3/2005 | Kim et al. | |

FOREIGN PATENT DOCUMENTS

| KR | 10-2004-0048038 | 6/2004 |
|---|---|---|
| KR | 10-2005-0024643 | 3/2005 |
| KR | 2005-059519 A | 6/2005 |

OTHER PUBLICATIONS

International Search Report for International Application No. PCT/KR2007/004996 dated Jan. 14, 2008 by Korean Intellectual Property Office.

* cited by examiner

*Primary Examiner* — Charles Shedrick
(74) *Attorney, Agent, or Firm* — Knobbe, Martens, Olson & Bear LLP

(57) ABSTRACT

A method and an apparatus for optimizing a neighbor list in a mobile communication system is disclosed. In one embodiment, the apparatus includes: i) a data collecting unit, collecting wireless quality measurement data and call fault data of a mobile communication terminal, wherein the call fault data is information on a call fault event generated because no sub-cell information is present in the neighbor list when the mobile communication terminal carries out a handover, ii) a data analyzing unit, analyzing the wireless quality measurement data and the call fault data and calculating a frequency of a sub-cell being included in an active set for each handover-possible target sub-cell and a frequency of call fault event occurrence, wherein the frequency of being included in the active set is a frequency of the sub-cell and target sub-cell being included simultaneously in the active set for handover and iii) a neighbor list optimizing unit using the frequency of being included in the active set and the frequency of call fault event occurrence to set an order of priority of handover-possible target sub-cells for the sub-cell and generating a neighbor list.

12 Claims, 10 Drawing Sheets

FIG. 8

| Field |
|---|
| Msg ID |
| Seq ID |
| Time |
| Mobile ID |
| FA |
| BLER |
| REF_PSC |
| Number of PSC |
| MSC[0] |
| RNC[0] |
| NodeB[0] |
| SEC[0] |
| PSC[0] |
| CPICH RSCP[0] |
| CPICH Ec/Io[0] |
| UE Transmitted Power |
| UE Rx-Tx Time Difference |
| RTT[0] |
| ⋮ |
| MSC[0] |
| RNC[n] |
| NodeB[n] |
| SEC[n] |
| PSC[n] |
| CPICH RSCP[n] |
| CPICH Ec/Io[n] |
| UE Transmitted Power[n] |
| UE Rx-Tx Time Difference |
| RTT[n] |

FIG. 9

| Field |
|---|
| Msg ID |
| Seq ID |
| Time |
| Mobile ID |
| FA |
| BLER |
| REF_PN |
| Number of PN |
| MID[0] |
| BSC[0] |
| BTS[0] |
| SEC[0] |
| PN[0] |
| PN_PHASE[0] |
| PN_STR[0] |
| RTD |
| ⋮ |
| NID[n] |
| BSC[n] |
| BTS[n] |
| SEC[n] |
| PN[n] |
| PN_PHASE[n] |
| PN_STR[n] |
| RTD[n] |

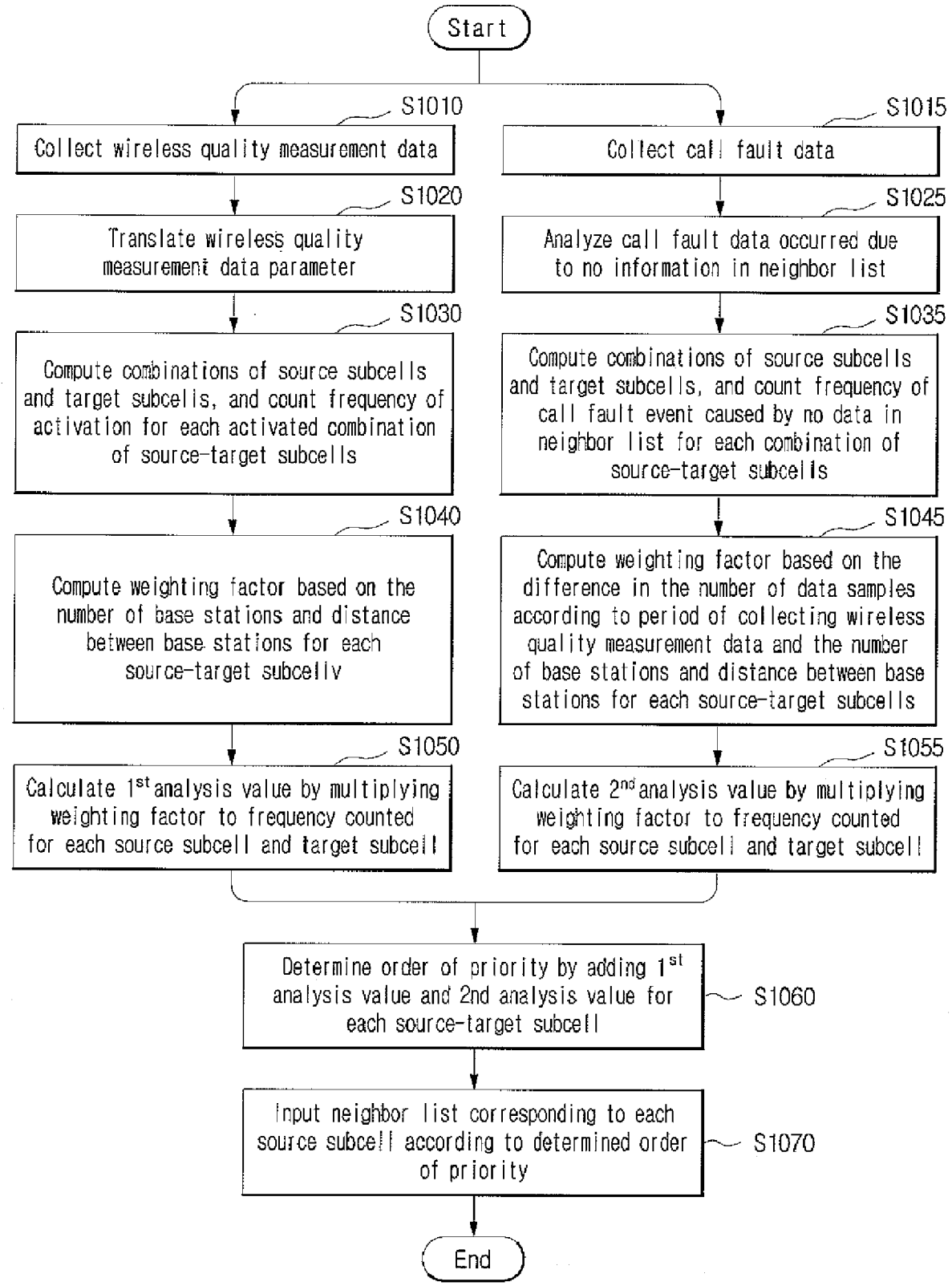

METHOD AND APPARATUS FOR OPTIMIZING NEIGHBOR LIST FOR HANDOVER MANAGEMENT

RELATED APPLICATIONS

This application is a continuation application, and claims the benefit under 35 U.S.C. §§120 and 365 of PCT Application No. PCT/KR2007/004996, filed on Oct. 12, 2007, which is hereby incorporated by reference.

BACKGROUND OF THE INVENTION

1. Field of the Invention

The present invention relates to a method and apparatus for optimizing a neighbor list in a mobile communication system, more specifically to a method and apparatus for optimizing a neighbor list, using wireless quality measurement data, in a mobile communication system.

2. Description of the Related Technology

In the mobile communication system, the entire service area is divided into a number of base stations to organize the service area with cells, which are small service areas. These base stations are centrally controlled with a switching system to ensure that subscribers can move between the cells to continue their calls using their mobile terminals. When the mobile terminal exits one base station and enters a new cell in the mobile communication system, the call can be continued through the handover function.

The efficiency of handover can differ in the reliability of call continuity and the system load, depending on how the handover is provided. The handover is mainly provided in two methods: soft handover and hard handover. The soft handover is a make-before-cut method, in which the call is cut after a new call is made, and the hard handover is a cut-before-make method, in which the call is cut before a new call is made. The mobile communication system usually provides the soft handover when the handover is required, but sometimes the hard handover is used to provide the call continuity if necessary.

SUMMARY OF CERTAIN INVENTIVE ASPECTS

One aspect of the present invention is a method and apparatus for optimizing a neighbor list that can enhance the reliability of a handover-related system, by organically analyzing wireless quality measurement data and call fault data of a mobile communication terminal and determining the priority of target subcells (or sub-cells) corresponding to source subcells.

Another aspect of the present invention features an apparatus for optimizing a neighbor list for handover in a mobile communication system.

The apparatus for optimizing a neighbor list for handover in a mobile communication system in accordance with an embodiment of the present invention can include: a data collecting unit, collecting wireless quality measurement data and call fault data of a mobile communication terminal, wherein the call fault data is information on a call fault event generated because no subcell (or sub-cell) information is present in the neighbor list when the mobile communication terminal carries out a handover; a data analyzing unit, analyzing the wireless quality measurement data and the call fault data and calculating a frequency of a subcell being included in an active set for each handover-possible target subcell and a frequency of call fault event occurrence, wherein the frequency of being included in the active set is a frequency of the subcell and target subcell being included simultaneously in the active set for handover; and a neighbor list optimizing unit, using the frequency of being included in the active set and the frequency of call fault event occurrence to set an order of priority of handover-possible target subcells for the subcell and generating a neighbor list.

Another aspect of the present invention features a method of optimizing a neighbor list for handover in a mobile communication system.

The method of optimizing a neighbor list for handover in a mobile communication system in accordance with an embodiment of the present invention can include the steps of: collecting wireless quality measurement data and call fault data of a mobile communication terminal, wherein the call fault data is information on a call fault event generated because no subcell information is present in the neighbor list when the mobile communication terminal carries out a handover; analyzing the wireless quality measurement data and the call fault data and calculating a frequency of a subcell being included in an active set for each handover-possible target subcell and a frequency of call fault event occurrence, wherein the frequency of being included in the active set is a frequency of the subcell and target subcell being included simultaneously in the active set for handover; setting an order of priority of handover-possible target subcells for the subcell by using the frequency of being included in the active set and the frequency of call fault event occurrence; and generating a neighbor list corresponding to the order of priority.

Another aspect of the invention is an apparatus for optimizing a neighbor list for handover in a mobile communication system, comprising: i) a data collecting unit configured to collect wireless quality measurement data and call fault data of a mobile communication terminal, wherein the call fault data indicates information regarding a call fault event generated due to absence of sub-cell information in the neighbor list when the mobile communication terminal carries out a handover, ii) a data analyzing unit configured to analyze the wireless quality measurement data and the call fault data and calculate a first frequency of a sub-cell being included in an active set for each handover-possible target sub-cell and a second frequency of call fault event occurrence, wherein the first frequency is calculated based on the sub-cell and target sub-cell being included simultaneously in the active set for handover and iii) a neighbor list optimizing unit configured to i) set an order of priority of handover-possible target sub-cells for the sub-cell based on the first and second frequencies and ii) generate a neighbor list corresponding to the order of priority.

In the above apparatus, the wireless quality measurement data may be collected at predetermined periods from an operation & maintenance (O&M) server being in data communication with a base station controller, and wherein the call fault data may be collected from the operation & maintenance server whenever a call fault event occurs. In the above apparatus, the wireless quality measurement data may comprise at least one selected from the group consisting of sub-cell information, common pilot channel reception signal strength information indicating a reception quality obtained from the mobile communication terminal, and Energy of Chips/Interference of Others (Ec/Io) information. The above apparatus may further comprise a location information verifying unit configured to compute a distance between the sub-cell and a base station, to which a target sub-cell corresponding to the sub-cell belongs, or the number of base stations located within a predetermined angle between the base stations based on the sub-cell information included in the wireless quality measurement data. In the above apparatus, the neighbor list optimizing unit may be adapted to i) configure a weighting factor based on the distance between the sub-cell and the base station, to which the target sub-cell corresponding to the sub-cell belongs, or the number of base stations located within a predetermined angle between the base stations and ii) configure an order of priority based on multiplication of the weighting factor and one of the first and second frequencies.

In the above apparatus, the neighbor list optimizing unit may be adapted to i) configure a weighting factor based on the difference in the number of samples between the wireless quality measurement data and the call fault data and ii) determine the order of priority based on the multiplication of the weighting factor and a call fault event frequency. The above apparatus may be included in an operation & maintenance (O&M) server connected to a base station controller and linked to the O&M server.

Another aspect of the invention is a method of optimizing a neighbor list for handover in a mobile communication system, comprising: i) collecting wireless quality measurement data and call fault data of a mobile communication terminal, wherein the call fault data is information regarding a call fault event generated due to absence of sub-cell information in the neighbor list when the mobile communication terminal carries out a handover, ii) analyzing the wireless quality measurement data and the call fault data, iii) calculating a first frequency of a sub-cell being included in an active set for each handover-possible target sub-cell and a second frequency of call fault event occurrence, wherein the first frequency is calculated based on the sub-cell and target sub-cell being included simultaneously in the active set for handover, iv) setting an order of priority of handover-possible target sub-cells for the sub-cell based on the first and second frequencies and v) generating a neighbor list corresponding to the order of priority.

In the above method, the calculating may comprise: i) extracting from the wireless quality measurement data at lease one selected from the group consisting of sub-cell information, common pilot channel reception signal strength information indicating a reception quality obtained from the mobile communication terminal, and Energy of Chips/Interference of Others (Ec/Io) information and ii) calculating a frequency of the sub-cell being simultaneously included in the active set for each handover-possible target sub-cell based on the extracted information.

In the above method, the setting comprises: i) configuring a weighting factor based on the distance between the sub-cell and the base station, to which the target sub-cell corresponding to the sub-cell belongs, or the number of base stations located within a predetermined angle between the base stations and ii) determining the order of priority based on the multiplication of the weighting factor and one of the first and second frequencies. In the above method, the setting may comprise: i) configuring a weighting factor based on the difference in the number of samples between the wireless quality measurement data and the call fault data and ii) determining the order of priority based on i) the multiplication the weighting factor and the second frequency and ii) the frequency of being simultaneously included in the active set.

Another aspect of the invention is one or more processor-readable storage devices having processor-readable code, the processor-readable code which, when executed by one or more processors, performs a method of optimizing a neighbor list for handover in a mobile communication system, the method comprising: i) collecting wireless quality measurement data and call fault data of a mobile communication terminal, wherein the call fault data is information regarding a call fault event generated due to absence of sub-cell information in the neighbor list when the mobile communication terminal carries out a handover, ii) analyzing the wireless quality measurement data and the call fault data and calculating a first frequency of a sub-cell being included in an active set for each handover-possible target sub-cell and a second frequency of call fault event occurrence, wherein the first frequency is calculated based on the sub-cell and target sub-cell being included simultaneously in the active set for handover, iii) setting an order of priority of handover-possible target sub-cells for the sub-cell based on the first and second frequencies and iv) generating a neighbor list corresponding to the order of priority.

Still another aspect of the invention is an apparatus for optimizing a neighbor list for handover in a mobile communication system, comprising: i) means for collecting wireless quality measurement data and call fault data of a mobile communication terminal, wherein the call fault data is information regarding a call fault event generated due to absence of sub-cell information in the neighbor list when the mobile communication terminal carries out a handover, ii) means for analyzing the wireless quality measurement data and the call fault data, iii) means for calculating a first frequency of a sub-cell being included in an active set for each handover-possible target sub-cell and a second frequency of call fault event occurrence, wherein the first frequency is calculated based on the sub-cell and target sub-cell being included simultaneously in the active set for handover, iv) means for setting an order of priority of handover-possible target sub-cells for the sub-cell based on the first and second frequencies and v) means for generating a neighbor list corresponding to the order of priority.

BRIEF DESCRIPTION OF THE DRAWINGS

FIGS. 8 and 9 show examples of parameter of wireless quality measurement data in accordance with an embodiment of the present invention.

FIG. 10 shows a flowchart for a neighbor list optimizing method in accordance with an embodiment of the present invention.

DETAILED DESCRIPTION OF CERTAIN INVENTIVE EMBODIMENTS

Figure 1:
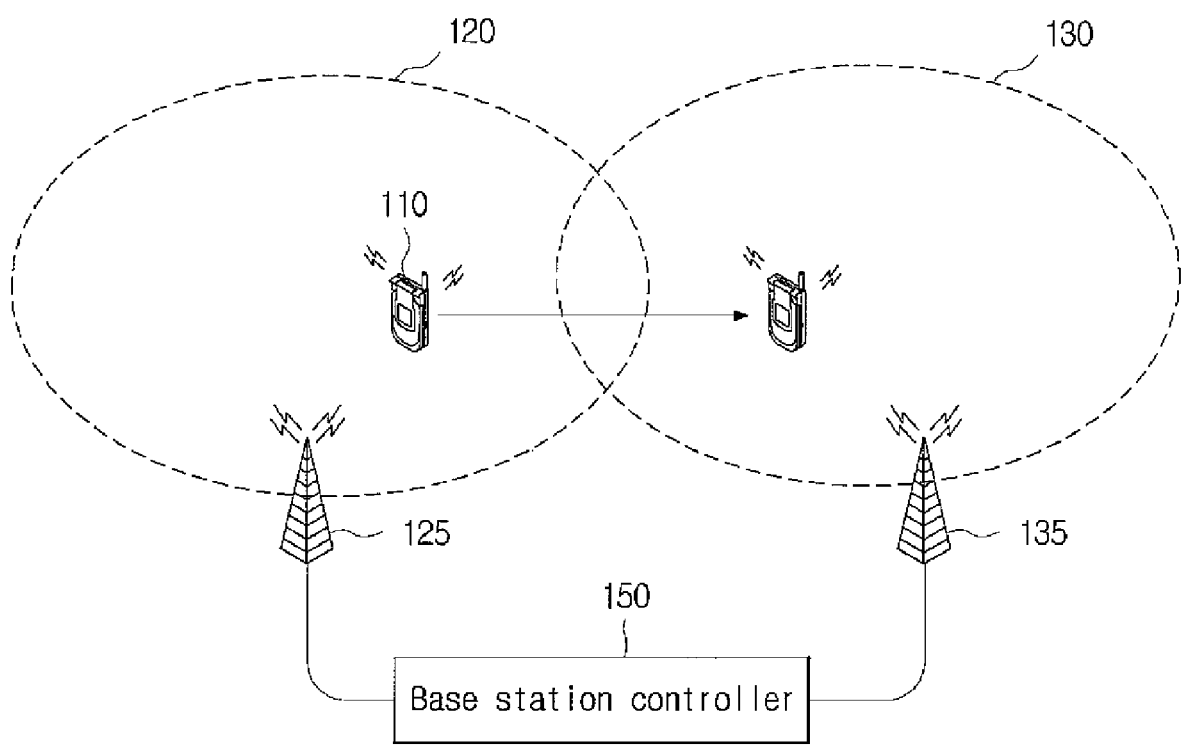
FIG. 1 shows a handover in a typical mobile communication system.

Generally, in order for a mobile terminal to correctly perform the handover, the current service-providing cell must have accurate information of the cell, to which the mobile terminal is proceeding. This kind of information is commonly referred to as a "neighbor list" in the mobile communication network, and only if this information is accurately registered, the handover can be carried out without any problem.

The neighbor list is usually created and updated manually by the administrator. This requires a lot of time to analyze the data, leaves a room for subjective entry and/or error, and takes a long time to verify the created neighbor list.

Korean patent 10-2004-48038, titled METHOD OF AUTOMATIC UPDATE FOR NEIGHBOR LIST IN CDMA COMMUNICATION SYSTEM, uses a neighbor pseudo noise (PN) statistics list to add handoff (handover)-failed PN in the neighbor list or raise a neighbor list extraction priority according to the number of failure by the handoff-failed PNs, increasing the success rate of handoff. However, since the neighbor list is updated in units of base station, the statistics information of PN that is not related to the base station can not be provided, making the update impossible.

In Korean patent 10-2005-24643, titled METHOD AND APPARATUS FOR GENERATING HANDOVER NEIGHBOR LIST IN CELLULAR TELECOMMUNICATION SYSTEM, the priority of base stations is determined in the order of the frequency of handover, and the neighbor list is created in this order. However, the analysis is restricted due to the use of handover statistics information in units of base station, inhibiting a high reliability of the list. Moreover, it is difficult in reality to verify accurate location information of a base station that is included in the statistics but not in the neighbor list. Thus, an accurate neighbor list is not easily calculated, and if there is a handover request for a sector in a remaining set, it is impossible to analyze an occurred call fault.

Hereinafter, some embodiments will be described in detail with reference to the accompanying drawings. Identical or corresponding elements will be given the same reference numerals, regardless of the figure number, and any redundant description of the identical or corresponding elements will not be repeated. Throughout the description, when describing a certain technology is determined to irrelevant to embodiments of the present invention, the pertinent detailed description will be omitted.

Although the present application is applicable in a CDMA communication system and many other mobile communication systems, the following description will use an example of the WCDMA system.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Figure 2:
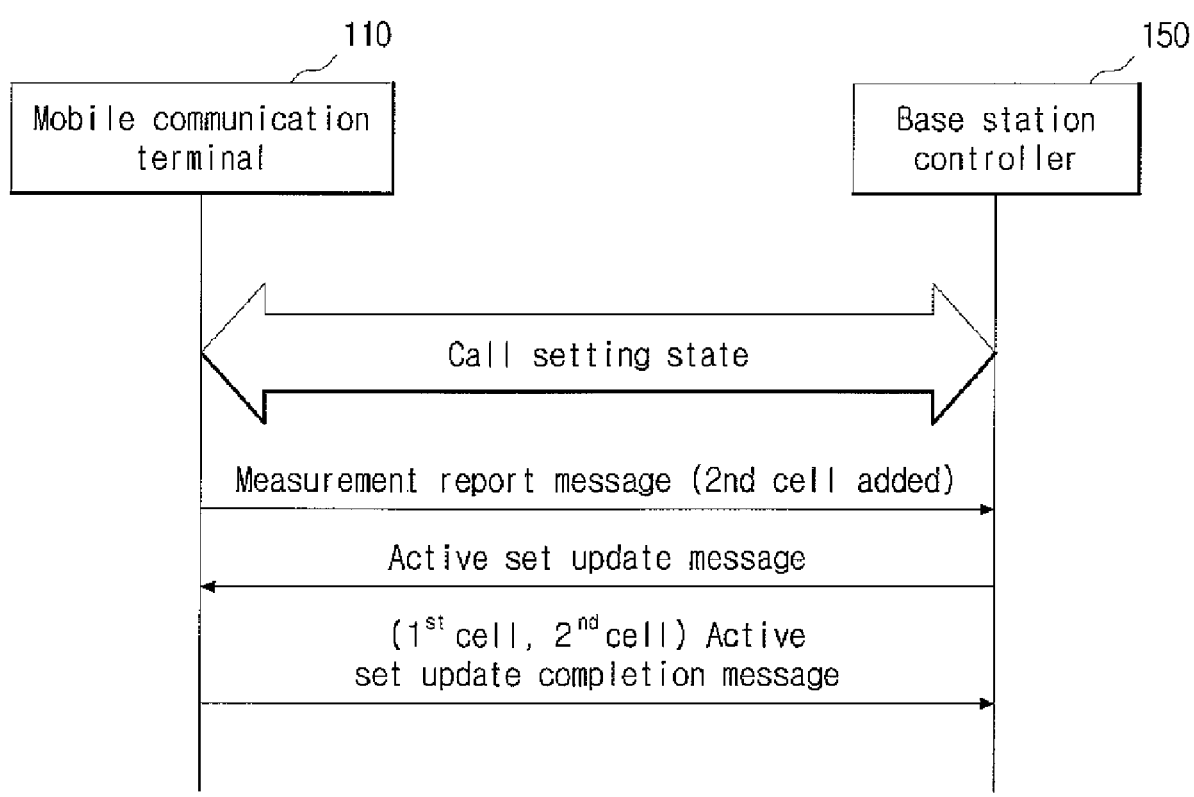
FIG. 2 shows a process diagram of how a handover is carried out when target subcell information is in a neighbor list.
Figure 3:
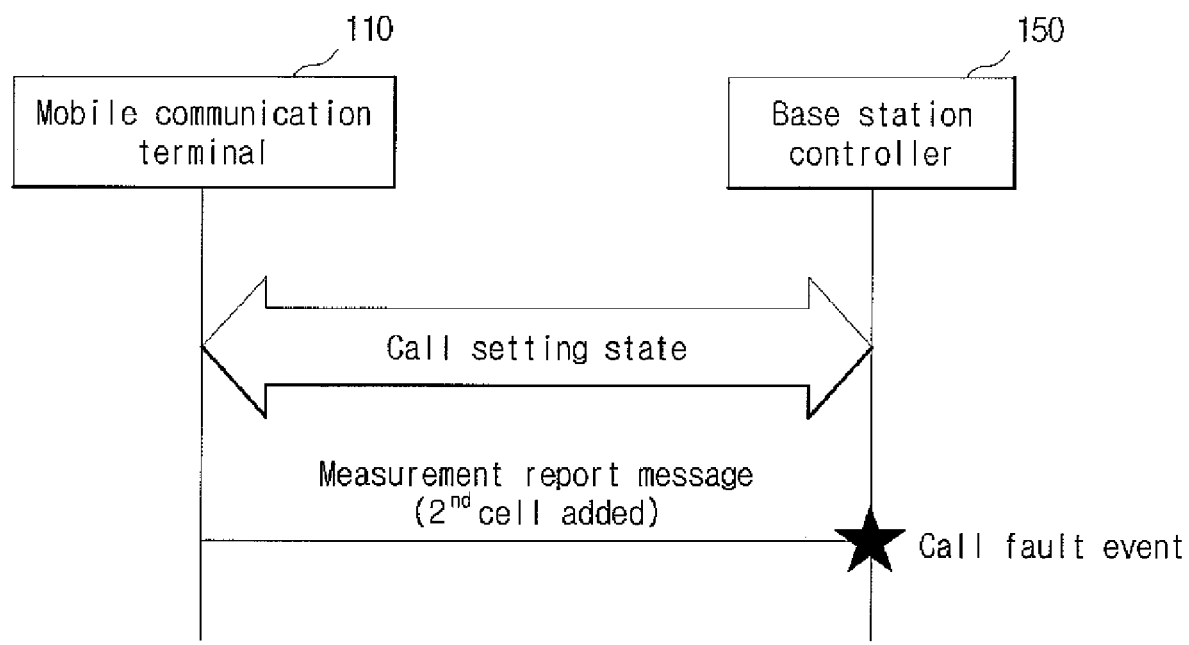
FIG. 3 shows a process diagram of how a handover is carried out when the target subcell information is not in the neighbor list.

FIG. 1 is a diagram for describing the handover in a typical mobile communication system. FIG. 2 is a process diagram showing how the handover is carried out when target subcell information is in a neighbor list, and FIG. 3 is a process diagram showing how the handover is carried out when the target subcell information is not in the neighbor list.

Referring to the mobile communication system shown in FIG. 1, while a mobile communication terminal 110 moves from a first cell 120 to a second cell 130, the intensity of a pilot signal of the second cell 130, which is a neighbor cell of the first cell 120, is measured. If the intensity of the pilot signal of the second cell 130 is over a predetermined threshold, a measurement report message is sent to a base station controller 150.

As shown in FIG. 2, the base station controller 150 analyzes the measurement report message, received from the mobile communication terminal 110. If information on the second cell 130, which is a target subcell, is present in a neighbor list, the base station controller 150 instructs a pertinent base station to assign a channel. After the assignment of the channel is completed, the base station controller 150 sends an active set update message to the mobile communication terminal 110.

The mobile communication terminal 110 then sends an active set update completion message to the base station 150, completing the handover process.

Shown in FIG. 3 is a process for handover failure carried out when the target subcell information does not exist in the neighbor list.

As shown in FIG. 3, if the intensity of the pilot signal of the second cell 130 is detected to be over a predetermined threshold, the mobile communication terminal 110 sends a measurement report message to the base station controller 150, which then analyzes the measurement report message. If the target subcell is verified to be not present in the neighbor list, the base station controller 150 generates a call fault event, indicating the failure of handover.

Figure 4:
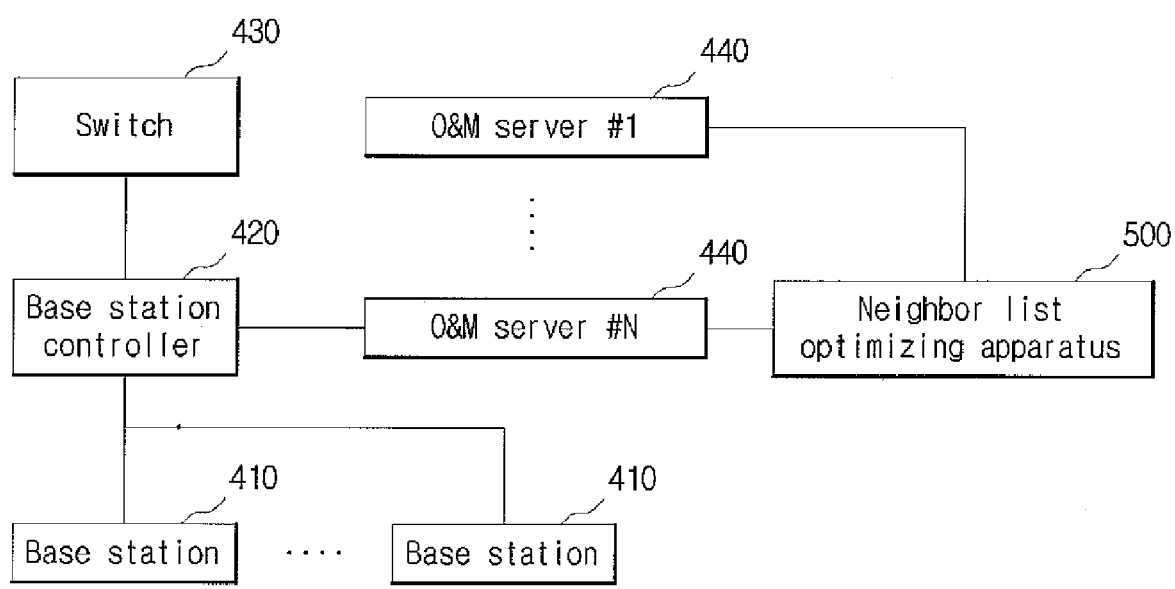
FIG. 4 shows a neighbor list optimizing apparatus in accordance with an embodiment of the present invention.

FIG. 4 illustrates a neighbor list optimizing apparatus in accordance with an embodiment of the present invention.

As shown in FIG. 4, the mobile communication system includes base stations 410, a base station controller 420, a switch 430, operation & maintenance servers 440, and a neighbor list optimizing apparatus 500.

The neighbor list optimizing apparatus 500 can be included in the operation & maintenance server, or can be disposed separately, as shown in FIG. 4.

The base stations 410 send and receive wireless signals, encode and decode wireless channels, measure signal strength and quality, process baseband signals, manage wireless resources, and perform maintenance.

The base station controller 420 performs the functions of matching between the base stations, processing the handover between cells, and controlling the call.

The base station controller 420 also generates an internal management process whenever there is a voice or data service, and controls between the terminal and system through this process. The management process generated by the base station controller 420 has various data for properly handling the message received from the terminal, in addition to the data received from the terminal.

The switch 430 functions as an interface with the base station controller 420, and handles the switching amongst mobile service subscribers and the switching (linking) between the mobile service subscribers and subscribers of landline networks such as PSTN (Public Subscriber Telephone Network) and ISDN (Integrated Services Digital Network).

The operation & maintenance servers 440 manage the base stations 410 and base station controller 420 and collect wireless quality measurement data, which is a measurement report message generated in the wireless network upon the request by the neighbor list optimizing apparatus 500, and call fault data caused by the failure of handover.

The neighbor list optimizing apparatus 500 periodically collects the wireless quality measurement data of the mobile communication terminal 110 through a plurality of operation & maintenance servers 440.

The neighbor list optimizing apparatus 500 collects the call fault data from the base station controller 420 through the plurality of operation & maintenance servers 440 whenever there is a call fault event.

The neighbor list optimizing apparatus 500 analyzes the collected wireless quality measurement data and call fault data, and optimizes the neighbor list using the result of analysis.

In more detail, the neighbor list optimizing apparatus 500 analyzes the collected wireless measurement data and call fault data simultaneously and generates combination of source subcells and target subcells.

Then, using the wireless quality measurement data of each source subcell-target subcell combination, the neighbor list optimizing apparatus 500 counts the frequency that is simultaneously included in an active set for handover.

The neighbor list optimizing apparatus 500 also counts the frequency of call fault event for each source subcell and target subcell.

The neighbor list optimizing apparatus 500 can count the frequency of simultaneous inclusion in the active set by analyzing the transmission power of a subcell and the reception strength of a pilot signal of the mobile communication terminal 110, using the information on the subcell and the wireless quality measurement data, such as the pilot signal reception strength or Ec/Io (Energy of Chips/Interference of Others) corresponding to each subcell.

Here, the information on the subcell can include a switch ID, a base station controller ID, a base station ID, a sector ID, an FA ID, a cell ID, and a subcell identifier (PSC information or PN information).

The neighbor list optimizing apparatus 500 also calculates a weighting factor, using the distance between the base stations, in which each subcell is located, and the number of interim base stations, which are located within a predetermined angle between the base stations, through the use of base station information for each combination of source subcell and target subcell.

The neighbor list optimizing apparatus 500 generates a neighbor list, with a predetermined order of priority, by arranging a first analysis value, in which the count calculated from each combination of source subcell and target subcell is multiplied by the weighting factor, and a second analysis value, in which the frequency count of call fault event is multiplied by the weighting factor.

The generated neighbor list can be notified to the mobile communication terminal 100 through the base station controller 420.

Figure 5:
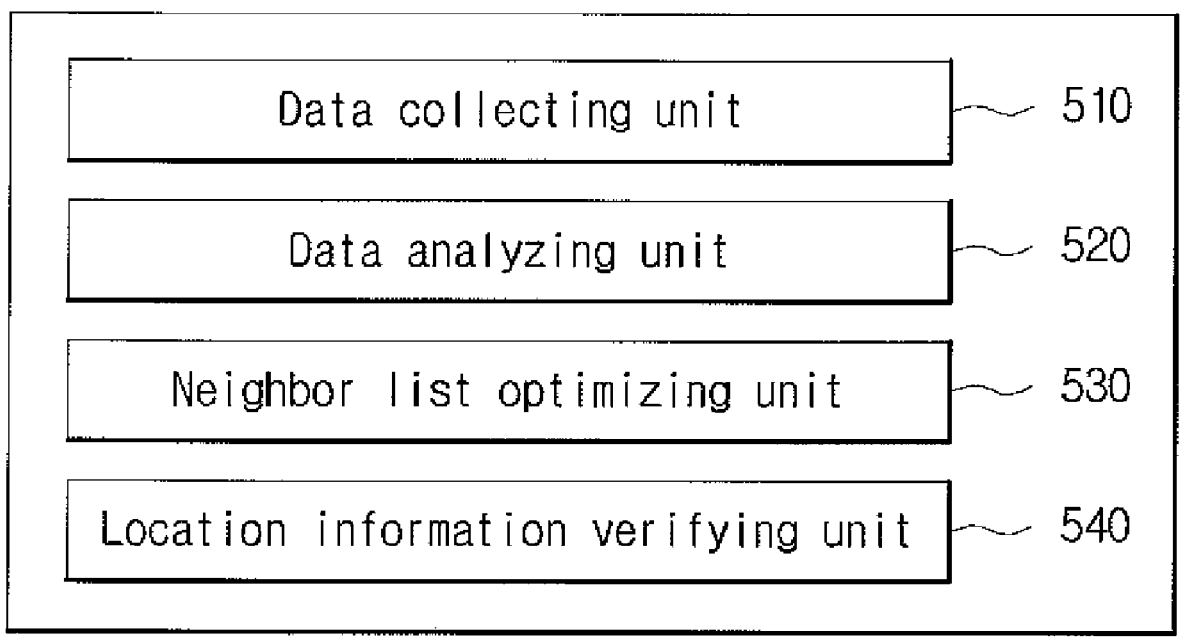
FIG. 5 shows a block diagram of a neighbor list optimizing apparatus in accordance with an embodiment of the present invention.

FIG. 5 is a block diagram of a neighbor list optimizing apparatus in accordance with an embodiment of the present invention.

Referring to FIG. 5, the neighbor list optimizing apparatus 500 in accordance with an embodiment of the present invention includes a data collecting unit 510, which collects wireless quality measurement data and call fault data of the mobile communication terminal 110, a data analyzing unit 520, which analyzes the collected data, counts the combination of source-target subcells, and calculates the weighting factor, and a neighbor list optimizing unit 530, which generates the neighbor list by determining the priority for the extracted source-target subcells.

The data collecting unit 510 collects from the plurality of operation & maintenance servers 440 the call fault data, in which an identifier (e.g. PSC data or PN data) of a subcell in which a call fault that failed the handover has occurred is included, and wireless quality measurement data.

Here, the wireless quality measurement data includes, as shown in FIGS. 8 and 9, each of subcell information, common pilot channel reception strength information for storing the reception quality obtained from the mobile terminal, and Ic/Io, and is collected at predetermined periods. Here the subcell information can include a switch ID, a base station controller ID, a base station ID, a sector ID, an FA ID, a cell ID, and a cell identifier (PSC data or PN data).

Here, the call fault data is information for the call fault event that occurs when there is no target subcell information in the neighbor list for handover, and includes information on the combination of source-target subcells in which the call fault has occurred. The call fault data is collected whenever there is a call fault.

The data collecting unit 510 collects the location information, including the latitude and longitude information, of every base station and subcell from the plurality of operation & maintenance servers 440.

The data analyzing unit 520 counts the frequency of simultaneous inclusion in the active set and call fault event occurrence for each source-target subcell combination, using the collected wireless quality measurement data and call fault data.

The data analyzing unit 520 considers as many source-target subcell combinations as possible.

The data analyzing unit 520 analyzes the information on each subcell, which is subdivided in the base station, the common pilot channel reception strength information for storing the reception quality obtained from the mobile terminal, and Ec/Io, among the periodically collected wireless quality measurement data.

The data analyzing unit 520 can count the frequency of simultaneous inclusion in the active set for handover for each source-target subcell.

Here, the subcell information can include a switch ID, a base station controller ID, a base station ID, a sector ID, an FA ID, a cell ID, and a subcell identifier (PSC information or PN information).

The data analyzing unit 520 can also analyze the call fault data, which is collected whenever there is a call fault event, and further includes the analysis in generating the neighbor list, contributing to generate a more reliable neighbor list.

The neighbor list optimizing unit 530 calculates a weighting factor, using the distance between the base stations, in which each subcell is located, and the number of interim base stations, which are located within a predetermined angle between the base stations. The neighbor list optimizing unit 530 can also set a higher weighting factor for the frequency of call fault event to adjust the number of collected call fault data only if the call fault event occurs corresponding to the wireless quality measurement data that has a large number of data due to periodical collection. This can be configured according to the amount of collected wireless quality measurement data and call fault data.

The neighbor list optimizing unit 530 calculates a final value by adding a value in which the counted frequency of handover occurrence for each source-target subcell is multiplied by the weighting factor and a value in which the frequency of call fault event is multiplied by the weighting factor.

The neighbor list optimizing unit 530 determines the order of priority for the calculated final value, and optimizes the neighbor list by inputting the target subcell information in the neighbor list in accordance with the determined order of priority.

The optimized neighbor list is inputted in the operation & maintenance servers 440, either automatically or manually, and is applied to the mobile communication system.

A location information verifying unit 540 verifies the location of the target subcell by utilizing the subcell information for each target subcell included in the collected wireless quality measurement data.

The location information verifying unit 540 verifies the distance information of a target cell, whose location information can not be found, by calculating the minimum distance between the source target cell and the target subcell, using the base location information and subcell identifier information (e.g. PSC data or PN data).

Figure 6:
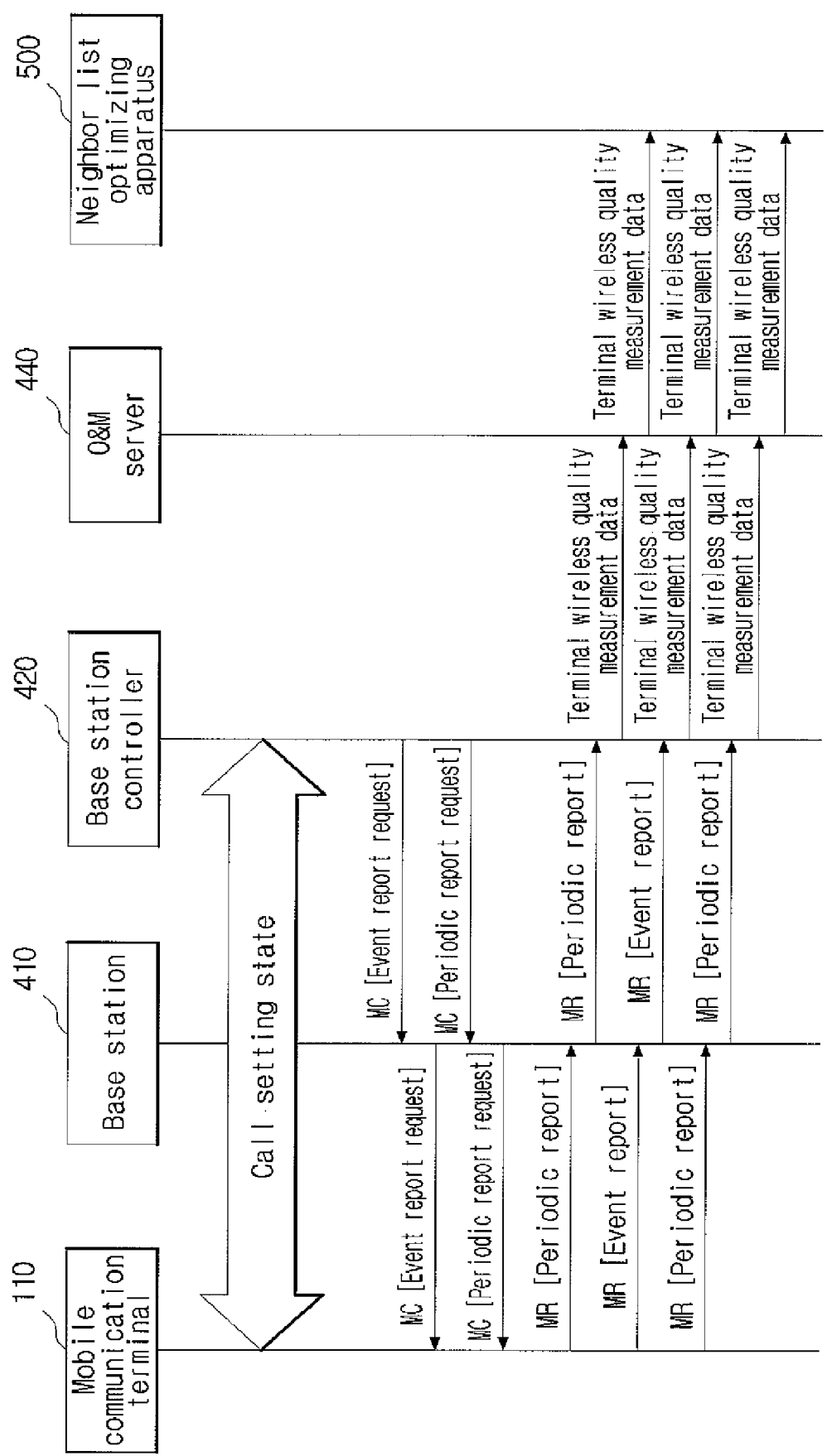
FIGS. 6 and 7 are process diagrams for data collection in accordance with an embodiment of the present invention.
Figure 7:
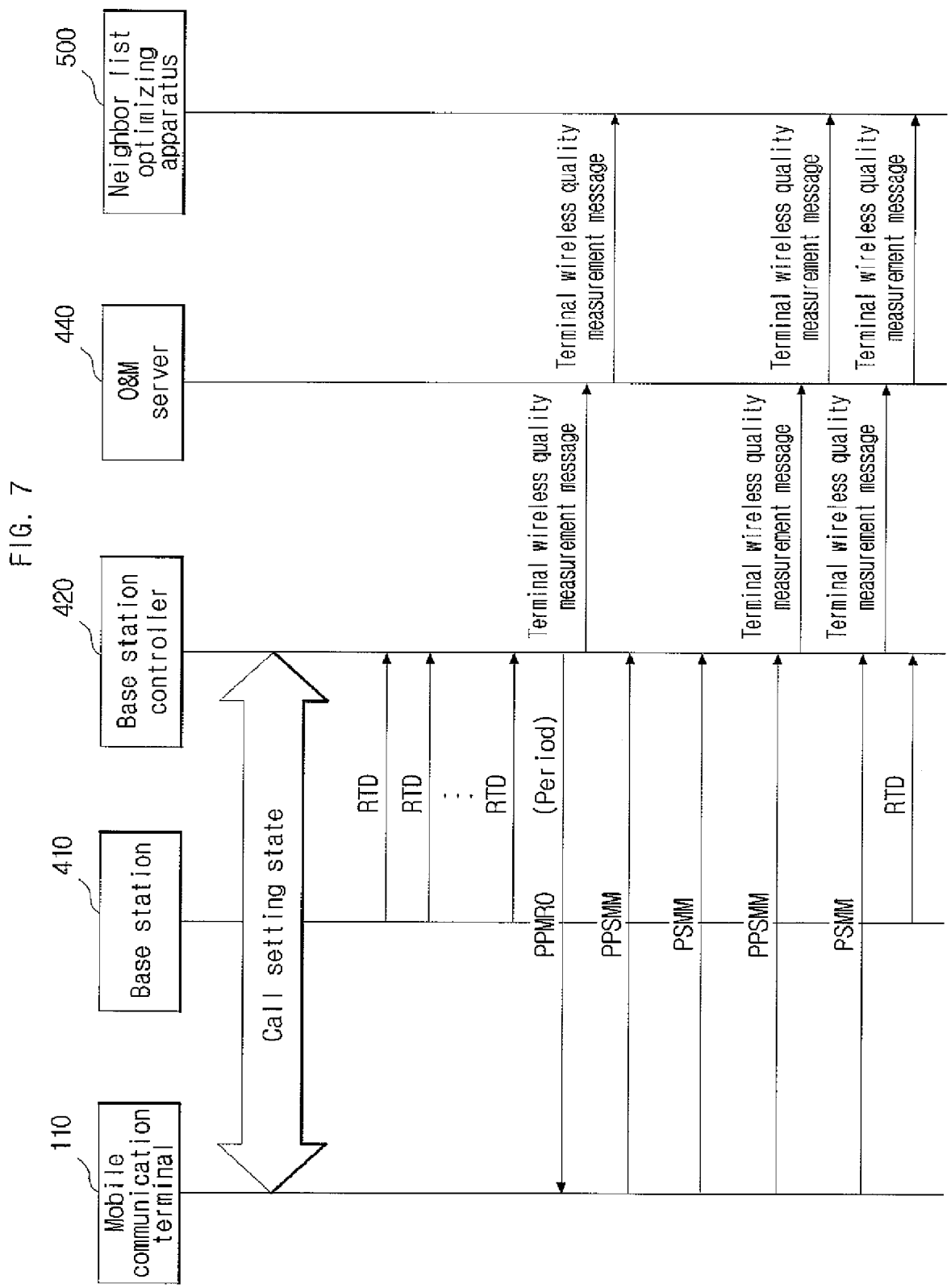

FIGS. 6 and 7 show how a call is processed for data collection in accordance with an embodiment of the present invention, and FIGS. 8 and 9 show examples of parameters of wireless quality measurement data in accordance with an embodiment of the present invention.

To ensure the continuity of the mobile service, it is required that the mobile communication system carry out the handover between the sectors or between the base stations.

Handover refers to maintaining the call connection by automatically linking to a new call channel of a neighboring base station when a mobile communication terminal 110 goes out of the base station service area and move to an area of the neighboring base station.

For this kind of handover, a user terminal usually sends wireless network quality information, measured by the terminal, to the base station 410.

FIG. 6 illustrates a call process corresponding to wireless quality measurement in a WCDMA system. The wireless quality measurement is carried out either periodically or at a particular time, that is, when an event occurs. The base station 410 receives wireless quality information from the mobile communication terminal 110 and sends the information to the base station controller 420.

The base station controller 420 analyzes a signal transmitted from the base station 410 and determines whether the handover is to be performed.

After determining whether to perform the handover, the base station controller 420 sends a message to the mobile terminal to perform the handover.

The neighbor list optimizing apparatus 500 configures the scope of data to be collected through the operation & maintenance server 440.

That is, the neighbor list optimizing apparatus 500 determines the scope of subcell information (e.g. MSC ID, RNC ID, Node B ID, Sector ID, FA ID, Cell ID, and PSC data), from which the wireless quality measurement message is to be collected, through the operation & maintenance server 440.

When the call is set up in a cell, where the wireless quality measurement message transmission function is activated through the operation & maintenance server by the call handling process, a measurement control (MC) message is sent to a corresponding subcell through the base station.

Then, the mobile communication terminal 110, which is serviced in the subcell, sends a wireless quality measurement report message, as a response to the MC message, to the base station controller 420 through the base station, to which the subcell belongs.

The base station controller 420 sends to and stores in the operation & maintenance server 440 the wireless quality measurement report message, which is received from the base station 410.

As shown in FIG. 8, the wireless quality measurement report message stored in the operation & maintenance server 440 of a WCDMA system can include a message identifier (Msg ID) field indicating the kind of message, a serial number identifier (Seq ID) field indicating the serial number of a message occurred in each job, a Time field indicating when the message is generated, a Mobile ID field which is the only identifier that identifies the terminal itself, an FA field indicating the service frequency of the terminal, an REF_PSC field indicating a reference PSC, a Number of PSC field indicating the number of measured PSC, an MSC field indicating the MSC number in the system, an RNC field indicating the base station controller number in the system, a Node B field indicating the base station number in the system, an SEC field indicating the sector number in the system, a PSC field indicating the PSC in the system, a CPICH (Common Pilot Channel) Received Signal Code Power field for storing the reception quality obtained from the terminal, a CPICH Ec/Io field, a BLER (Block Error Rate) field, a UE Transmitted Power field, an UE Rx-Tx Time Difference field, and an RTT field.

FIG. 7 illustrates the call handling process corresponding to wireless network quality measurement in a CDMA system.

While a call is connected between the mobile communication terminal 100 and the mobile communication network, the base station controller 420 sends a PPMRO (Periodic Pilot Measurement Report Order) message, in which the transmission period is configured.

The mobile communication terminal 100 receives the PPMRO message from the base station controller 420, and sends a PPSMM (Periodic Pilot Strength Measurement Message) as a response to the PPMRO message.

The mobile communication terminal 100 can also send a PSMM (Pilot Strength Measurement Message) at a particular time.

Here, the PPSMM message and PSMM message can include a plurality of fields indicating the wireless quality, for example, a PILOT_STRENGTH field, PN Phase field, and PN Strength field.

Moreover, unlike the PSMM message, the PPSMM message can also include an SF_RS_PWR field, indicating an RSSI value measured in the mobile terminal.

Therefore, using the PPSMM message can be more effective to find out about the RSSI, PN, and Ec/Io of the wireless network.

The base station controller 420 sends to and stores in operation & maintenance server 440 the wireless quality measurement message received from the base station 410. This process can be made in real time and in units of memory block.

As shown in FIG. 9, the wireless quality measurement message stored in the operation & maintenance server 440 of the CDMA system can include a Msg ID field indicating the kind of message, a Seq ID field indicating the serial number of a message generated in each job, a Time field indicating when the message is generated, a Mobile ID field, which is the only identifier that identifies the terminal itself, an SF_RX_PWR field indicating the RSSI extracted from the PPSMM message of the terminal, an FA field indicating the service frequency of the terminal, an REF_ON field indicating a reference PN, a Number of PN field indicating the number of measured PH, an NID field indicating the NID number in the system, a BSC field indicating the base station controller number in the system, a BTS field indicating the base station number in the system, an SEC field indicating the sector number in the system, a PN field indicating the PN in the system, a PH_PHASE field indicating the PN phase information obtained from the terminal, a PN_STR field, and an RTD field indicating n RTD (Round Trip Delay) value extracted as system (base station and base station controller) internal information when the PSMM message or PPSMM message of the terminal is generated.

The operation & maintenance server (O&M server) 440 combines a message (PSMM message or PPSMM message) received from the terminal and internally-managed data to generate the wireless quality measurement message. The wireless quality measurement message can be difference depending on the system manufacturer.

The neighbor list optimizing apparatus 500 collects the wireless quality measurement data and call fault data, using the wireless quality measurement message (periodic measurement report and/or event measurement report) collected through the operation & maintenance server 440.

Here, as described earlier, the wireless quality measurement data can include subcell information, the reception strength of the terminal, the pilot signal strength, and the terminal transmission power.

FIG. 10 is a flowchart for a neighbor list optimizing method using wireless quality measurement data in accordance with an embodiment of the present invention.

In the steps represented by S1010 and S1015, the neighbor list optimizing apparatus 500 collects wireless quality measurement data and call fault data, respectively, corresponding to every subcell making up the wireless communication network.

Here, as described earlier, the wireless quality measurement data includes each of subcell information, common pilot channel reception strength information for indicating the reception quality obtained from the mobile terminal, and Ic/Io, and is collected at predetermined periods.

The subcell information can include a switch ID, a base station controller ID, a base station ID, a sector ID, an FA ID, a cell ID, and a cell identifier (PSC data or PN data).

The call fault data refers to information on a call fault event that occurred when there is no target subcell information in a neighbor list for handover. The call fault data includes information on a source-target subcell combination in which the call fault event occurred, and is collected whenever a call fault event occurs.

The location information of the base station indicates the latitude and longitude of the base station.

As described above, it is preferable that the data be collected in units of subcell for accurate analysis, but it is also possible that the data is collected in units of sector if the network load allows. The following embodiment will describe the data being processed in units of nationwide base station subcells.

In S1020, the neighbor list optimizing apparatus 500 analyzes the collected wireless quality measurement data.

Moreover, in S1025, the neighbor list optimizing apparatus 500 separates the call fault data, in which a call fault event has occurred because there is no target subcell information in the neighbor list, and analyzes the parameter of the separated call fault data.

In S1030 and S1035, the neighbor list optimizing apparatus 500 computes all combinations of source subcells and target subcells that are capable of handover, and counts the frequency of inclusion in an active set for each combination of source-target subcells that is simultaneously included in the active set for handover.

The neighbor list optimizing apparatus 500 also counts the frequency of call fault event by separating source-target subcells in which the call fault event has occurred because there is no neighbor list in the combinations of target subcells to which the source subcells can be moved.

In S1040, the neighbor list optimizing apparatus 500 calculates a weighting factor based on the number of and distance between base stations, to which each source-target subcell belongs, for the counted frequency by analyzing the wireless quality measurement data.

In S1045, the neighbor list optimizing apparatus 500 configures a weighting factor based on the difference in the number of data samples according to the period of collecting wireless quality measurement data, the distance between base stations to which each source-target subcell belongs, and the number of base stations present within a predetermined angle between the base stations, for the counted frequency by analyzing the call fault data.

Here, the weighting factor based on the difference in the number of data samples according to the period of collecting the wireless quality measurement data is configured because the number of call fault data samples is much smaller than the number of wireless quality measurement data samples, which are collected and counted at a given periods. As the rate reflected in the final value by the frequency counted by analyzing the call fault data is too minute, an adjustment is made through the use of the weighting factor.

Moreover, the weighting factor based on the distance between the base station to which each source-target subcell belongs and the number of base stations present within the predetermined angle between the base stations is for adjusting the fact that there is a higher chance of handover when there is less distance or are less base stations between the base stations.

In S1050, the neighbor list optimizing apparatus 500 calculates a first analysis value, in which the frequency counted by analyzing the wireless quality measurement data is multiplied by the weighting factor.

In S1055, the neighbor list optimizing apparatus 500 calculates a second analysis value, in which the frequency counted by analyzing the call fault data is multiplied by the weighting factor.

In S1060, the neighbor list optimizing apparatus 500 determines an order of priority for each source-target subcell by adding the first analysis value and the second analysis value.

In S1070, the neighbor list optimizing apparatus 500 generates a neighbor list which lists the target subcells according to the order of priority determined for all source subcells.

The method according to embodiments of the present invention, described hitherto, can be embodied in a program and stored in a recorded medium (e.g. CD-ROM, RAM, ROM, Floppy Disk, Hard Disk, and Optical Disk) in a computer-readable format.

At least one embodiment of the present invention can enhance the reliability of a handover-related system by organically analyzing the wireless quality measurement data and call fault data and determining the order of priority of target subcells corresponding to each source subcell.

Although certain embodiment has been described, anyone skilled in the art to which the present invention pertains shall understand that a very large number of permutations and modification are possible without departing the technical ideas and scope of the present invention, which shall only be defined by the appended claims.

What is claimed is:

1. An apparatus for optimizing a neighbor list for handover in a mobile communication system, comprising:
    a data collecting unit configured to collect wireless quality measurement data and call fault data of a mobile communication terminal, wherein the call fault data indicates information regarding a call fault event generated due to absence of sub-cell information in the neighbor list when the mobile communication terminal carries out a handover;
    a data analyzing unit configured to analyze the wireless quality measurement data and the call fault data and calculate a first frequency of a sub-cell being included in an active set for each handover-possible target sub-cell and a second frequency of call fault event occurrence, wherein the first frequency is calculated based on the sub-cell and target sub-cell being included simultaneously in the active set for handover; and
    a neighbor list optimizing unit configured to i) set an order of priority of handover-possible target sub-cells for the sub-cell based on the first and second frequencies and ii) generate a neighbor list corresponding to the order of priority in conjunction with a processor,
    wherein the neighbor list optimizing unit is adapted to i) configure a weighting factor based on the difference in the number of samples between the wireless quality measurement data and the call fault data and ii) determine the order of priority based on the multiplication of the weighting factor and a call fault event frequency.

2. The apparatus of claim 1, wherein the wireless quality measurement data is collected at predetermined periods from an operation & maintenance (O&M) server being in data communication with a base station controller, and wherein the call fault data is collected from the operation & maintenance server whenever a call fault event occurs.

3. The apparatus of claim 1, wherein the wireless quality measurement data comprises at least one selected from the group consisting of sub-cell information, common pilot channel reception signal strength information indicating a reception quality obtained from the mobile communication terminal, and Energy of Chips/Interference of Others (Ec/Io) information.

4. The apparatus of claim 1, further comprising a location information verifying unit configured to compute a distance between the sub-cell and a base station, to which a target sub-cell corresponding to the sub-cell belongs, or the number of base stations located within a predetermined angle between the base stations based on the sub-cell information included in the wireless quality measurement data.

5. The apparatus of claim 1, wherein the apparatus is included in an operation & maintenance (O&M) server connected to a base station controller and linked to the O&M server.

6. An apparatus for optimizing a neighbor list for handover in a mobile communication system, comprising:
    a data collecting unit configured to collect wireless quality measurement data and call fault data of a mobile communication terminal, wherein the call fault data indicates information regarding a call fault event generated due to absence of sub-cell information in the neighbor list when the mobile communication terminal carries out a handover;
    a data analyzing unit configured to analyze the wireless quality measurement data and the call fault data and calculate a first frequency of a sub-cell being included in an active set for each handover-possible target sub-cell and a second frequency of call fault event occurrence, wherein the first frequency is calculated based on the sub-cell and target sub-cell being included simultaneously in the active set for handover;
    a neighbor list optimizing unit configured to i) set an order of priority of handover-possible target sub-cells for the sub-cell based on the first and second frequencies and ii) generate a neighbor list corresponding to the order of priority in conjunction with a processor; and
    a location information verifying unit configured to compute a distance between the sub-cell and a base station, to which a target sub-cell corresponding to the sub-cell belongs, or the number of base stations located within a predetermined angle between the base stations based on the sub-cell information included in the wireless quality measurement data,
    wherein the neighbor list optimizing unit is adapted to i) configure a weighting factor based on the distance between the sub-cell and the base station, to which the target sub-cell corresponding to the sub-cell belongs, or the number of base stations located within a predetermined angle between the base stations and ii) configure an order of priority based on multiplication of the weighting factor and one of the first and second frequencies.

7. A method of optimizing a neighbor list for handover in a mobile communication system, comprising:
    collecting wireless quality measurement data and call fault data of a mobile communication terminal, wherein the call fault data is information regarding a call fault event generated due to absence of sub-cell information in the neighbor list when the mobile communication terminal carries out a handover;
    analyzing the wireless quality measurement data and the call fault data;
    calculating a first frequency of a sub-cell being included in an active set for each handover-possible target sub-cell and a second frequency of call fault event occurrence, wherein the first frequency is calculated based on the sub-cell and target sub-cell being included simultaneously in the active set for handover;
    setting an order of priority of handover-possible target sub-cells for the sub-cell based on the first and second frequencies;
    generating a neighbor list corresponding to the order of priority in conjunction with a processor;
    configuring a weighting factor based on the difference in the number of samples between the wireless quality measurement data and the call fault data; and
    determining the order of priority based on the multiplication of the weighting factor and a call fault event frequency.

8. The method of claim 7, wherein the calculating comprises:

extracting from the wireless quality measurement data at lease one selected from the group consisting of sub-cell information, common pilot channel reception signal strength information indicating a reception quality obtained from the mobile communication terminal, and Energy of Chips/Interference of Others (Ec/Io) information; and calculating a frequency of the sub-cell being simultaneously included in the active set for each handover-possible target sub-cell based on the extracted information.

9. A method of optimizing a neighbor list for handover in a mobile communication system, comprising:

collecting wireless quality measurement data and call fault data of a mobile communication terminal, wherein the call fault data is information regarding a call fault event generated due to absence of sub-cell information in the neighbor list when the mobile communication terminal carries out a handover;

analyzing the wireless quality measurement data and the call fault data;

calculating a first frequency of a sub-cell being included in an active set for each handover-possible target sub-cell and a second frequency of call fault event occurrence, wherein the first frequency is calculated based on the sub-cell and target sub-cell being included simultaneously in the active set for handover;

setting an order of priority of handover-possible target sub-cells for the sub-cell based on the first and second frequencies; and generating a neighbor list corresponding to the order of priority in conjunction with a processor, wherein the setting comprises:

configuring a weighting factor based on the distance between the sub-cell and the base station, to which the target sub-cell corresponding to the sub-cell belongs, or the number of base stations located within a predetermined angle between the base stations; and determining the order of priority based on the multiplication of the weighting factor and one of the first and second frequencies.

10. A method of optimizing a neighbor list for handover in a mobile communication system, comprising:

collecting wireless quality measurement data and call fault data of a mobile communication terminal, wherein the call fault data is information regarding a call fault event generated due to absence of sub-cell information in the neighbor list when the mobile communication terminal carries out a handover;

analyzing the wireless quality measurement data and the call fault data;

calculating a first frequency of a sub-cell being included in an active set for each handover-possible target sub-cell and a second frequency of call fault event occurrence, wherein the first frequency is calculated based on the sub-cell and target sub-cell being included simultaneously in the active set for handover;

setting an order of priority of handover-possible target sub-cells for the sub-cell based on the first and second frequencies; and generating a neighbor list corresponding to the order of priority in conjunction with a processor, wherein the setting comprises:

configuring a weighting factor based on the difference in the number of samples between the wireless quality measurement data and the call fault data; and determining the order of priority based on i) the multiplication the weighting factor and the second frequency and ii) the frequency of being simultaneously included in the active set.

11. One or more processor-readable non-transitory storage devices having processor-readable code, the processor-readable code which, when executed by one or more processors, performs a method of optimizing a neighbor list for handover in a mobile communication system, the method comprising:

collecting wireless quality measurement data and call fault data of a mobile communication terminal, wherein the call fault data is information regarding a call fault event generated due to absence of sub-cell information in the neighbor list when the mobile communication terminal carries out a handover;

analyzing the wireless quality measurement data and the call fault data and calculating a first frequency of a sub-cell being included in an active set for each handover-possible target sub-cell and a second frequency of call fault event occurrence, wherein the first frequency is calculated based on the sub-cell and target sub-cell being included simultaneously in the active set for handover;

setting an order of priority of handover-possible target sub-cells for the sub-cell based on the first and second frequencies;

generating a neighbor list corresponding to the order of priority;

configuring a weighting factor based on the difference in the number of samples between the wireless quality measurement data and the call fault data; and determining the order of priority based on the multiplication of the weighting factor and a call fault event frequency.

12. An apparatus for optimizing a neighbor list for handover in a mobile communication system, comprising:

means for collecting wireless quality measurement data and call fault data of a mobile communication terminal, wherein the call fault data is information regarding a call fault event generated due to absence of sub-cell information in the neighbor list when the mobile communication terminal carries out a handover;

means for analyzing the wireless quality measurement data and the call fault data;

means for calculating a first frequency of a sub-cell being included in an active set for each handover-possible target sub-cell and a second frequency of call fault event occurrence, wherein the first frequency is calculated based on the sub-cell and target sub-cell being included simultaneously in the active set for handover;

means for setting an order of priority of handover-possible target sub-cells for the sub-cell based on the first and second frequencies;

means for generating a neighbor list corresponding to the order of priority in conjunction with a processor;

means for configuring a weighting factor based on the difference in the number of samples between the wireless quality measurement data and the call fault data; and means for determining the order of priority based on the multiplication of the weighting factor and a call fault event frequency.

* * * * *